United States Patent
Juels et al.

(10) Patent No.: US 9,515,989 B1
(45) Date of Patent: Dec. 6, 2016

(54) METHODS AND APPARATUS FOR SILENT ALARM CHANNELS USING ONE-TIME PASSCODE AUTHENTICATION TOKENS

(75) Inventors: Ari Juels, Brookline, MA (US); Nikolaos Triandopoulos, Arlington, MA (US); Marten Erik van Dijk, Somerville, MA (US); Ronald Rivest, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 998 days.

(21) Appl. No.: 13/404,788

(22) Filed: Feb. 24, 2012

(51) Int. Cl.
*G06F 21/00* (2013.01)
*H04L 29/06* (2006.01)

(52) U.S. Cl.
CPC .............. *H04L 63/00* (2013.01); *H04L 63/065* (2013.01); *H04L 63/0869* (2013.01)

(58) Field of Classification Search
CPC . H04L 63/065; H04L 63/0869; G06F 11/006
See application file for complete search history.

(56) References Cited

U.S. PATENT DOCUMENTS

| | | | |
|---|---|---|---|
| 4,825,050 A * | 4/1989 | Griffith et al. | 235/379 |
| 5,732,138 A * | 3/1998 | Noll | G06F 7/582 380/28 |
| 5,754,652 A * | 5/1998 | Wilfong | 713/183 |
| 7,096,496 B1 * | 8/2006 | Challener | G06F 21/31 713/100 |
| 8,788,817 B1 | 7/2014 | Juels et al. | |
| 8,824,677 B1 * | 9/2014 | Ramzan et al. | 380/268 |
| 2003/0061480 A1 * | 3/2003 | Le et al. | 713/153 |
| 2003/0084304 A1 * | 5/2003 | Hon | G06Q 20/367 713/185 |
| 2004/0123116 A1 | 6/2004 | Jin et al. | |
| 2004/0172535 A1 * | 9/2004 | Jakobsson et al. | 713/168 |
| 2005/0124288 A1 | 6/2005 | Karmi et al. | |
| 2006/0190723 A1 * | 8/2006 | Benson | 713/165 |
| 2006/0285684 A1 * | 12/2006 | Rogaway | H04L 9/0637 380/37 |
| 2007/0033397 A1 | 2/2007 | Phillips, II et al. | |
| 2007/0076871 A1 * | 4/2007 | Renes | H04L 9/0858 380/201 |
| 2007/0116266 A1 | 5/2007 | Greco et al. | |
| 2007/0208986 A1 * | 9/2007 | Luo | H03M 13/136 714/752 |
| 2008/0037791 A1 | 2/2008 | Jakobsson | |
| 2008/0141340 A1 * | 6/2008 | Ohyama | 726/2 |
| 2009/0271687 A1 * | 10/2009 | Lee | H04N 21/23614 714/784 |
| 2009/0276621 A1 | 11/2009 | Matsuo | |

(Continued)

OTHER PUBLICATIONS

Bellar et. al. "Forward-Security in Private-Key Cryptography", Nov. 2000, http://eprint.iacr.org/2001/035.pdf.*

(Continued)

*Primary Examiner* — Andrew Nalven
*Assistant Examiner* — Mary Li
(74) *Attorney, Agent, or Firm* — Ryan, Mason & Lewis, LLP (57) ABSTRACT

Methods and apparatus are provided for silent alarm channels using one-time passcode authentication tokens. A message is transmitted indicating a potential attack on a protected resource by obtaining the message; combining the message with a tokencode generated by a security token to generate a one-time passcode; and transmitting the one-time passcode to a receiver. A plurality of the messages can be obtained in parallel, and the plurality of parallel messages can be combined with the tokencode to generate the one-time passcode. A subsequent message can optionally be generated by applying a hash function to a prior n-bit value to provide a counter identifying each message. The message optionally also comprises one or more additional bits to provide an annotation of the message.

31 Claims, 5 Drawing Sheets (56) References Cited

U.S. PATENT DOCUMENTS

2009/0323972 A1 12/2009 Kohno et al.
2010/0058077 A1 3/2010 Matsuda et al.

OTHER PUBLICATIONS

Lu et al. Authenticated Encryption Protocol with Perfect Forward Secrecy for Mobile Communications, 2006, Wiley & Son Ltd. 2006, 273-281.
Bellare et al., Forward-Security in Private-Key Cryptography, 2003, Springer-Verlag Berlin Heidelberg, pp. 1-18.
Shi et al. Secure Range Queries in Tiered Sensor Network, 2009, IEEE, pp. 945-953.
Mauw et al. Forward Secure Communication in Wireless Sensor Networks, 2006, Springer-Verlag Berlin Heidelberg, pp. 32-42.
Di Ma, Practical Forward Secure Sequential Aggregate Signatures, 2008, ACM, pp. 341-352.
Gene Itkis et al. Forward Security—Adaptive Cryptography: Time Evolution, 2004, Boston University, pp. 1-27.
Canetti et al. Forward-Secure Public-Key Encryption Scheme, 2003, Eurocrypt, pp. 1-26.
Holt, Logcrypt: Forward Security and Public Verification for Secure Audit Logs, Fourth Australasian Information Security Workshop (AISW-NetSec 2006), pp. 1-9.
Yavuz et al. Hash-Based Sequential Aggregate and Forward Secure Signature for Unattended Wireless Sensor Networks, Mobile and Ubiquitous Systems: Networking & Services, MobiQuitous, 2009, MobiQuitous' 09. 6th Annual International. IEEE, 2009, pp. 1-10.
M. Bellare et al., Authenticated Encryption: Relations Among Notions and Analysis of the Generic Composition Paradigm, Jul. 14, 2007.

* cited by examiner

(12)  United States Patent
US 9,515,989 B1

METHODS AND APPARATUS FOR SILENT ALARM CHANNELS USING ONE-TIME PASSCODE AUTHENTICATION TOKENS

CROSS-REFERENCE TO RELATED APPLICATIONS

The present invention is related to U.S. patent application Ser. No. 13/404,737, entitled "Methods and Apparatus for Authenticating a User Using Multi-Server One-Time Passcode Verification," now U.S. Pat. No. 9,118,661; and U.S. patent application Ser. No. 13/404,780, entitled "Methods and Apparatus for Embedding Auxiliary Information in One-Time Passcode Authentication Tokens," now U.S. Pat. No. 8,984,609, each filed contemporaneously herewith and incorporated by reference herein.

FIELD OF THE INVENTION

The present invention relates generally to techniques for secure transmission of messages over a network or other types of communication systems.

BACKGROUND OF THE INVENTION

When an attacker compromises a computing system, the attacker can evade discovery most effectively by corrupting the system's detection and signaling mechanisms. For instance, on infecting a host, a virus will often try to disable or conceal itself from anti-virus software. Many systems therefore attempt to defend themselves pre-emptively, as an attack is unfolding. Intrusion detection systems, for instance, analyze the behavior of a range of devices in order to isolate security breaches in their early stages, before they achieve extensive system compromise.

Tampering is notably problematic, for example, in security logs. An attacker can corrupt a device's log in exactly the same way that it can corrupt other defensive tools such as anti-virus software. The attacker can even remove or omit log entries that might raise suspicions of the presence of the attacker.

U.S. patent application Ser. No. 13/249,957, filed Sep. 30, 2011, entitled "Methods and Apparatus for Secure and Reliable Transmission of Messages Over a Silent Alarm Channel," now U.S. Pat. No. 8,788,817, discloses silent alarm channels that are cryptographically protected channels between potentially compromised devices and a trustworthy log-collection point or server. A silent alarm implements a cryptographic channel between a sender and a receiver through which messages are transmitted: (1) securely, meaning that the alarm is unreadable and unchangeable, (2) undetectably, meaning that the alarm is silent, and (3) persistently, meaning that the alarm cannot be turned off.

While a silent alarm channel prevents an attacker of a compromised device from determining whether there is a message in the channel and from blocking the channel without being detected, existing silent alarm channel implementations assume a high-bandwidth elementary communication channel and employ cryptographic formats that incur considerable communication costs.

A need therefore remains for silent alarm channels that can be employed using the limited bandwidth and resources provided by one-time passcode authentication tokens.

SUMMARY OF THE INVENTION

Generally, methods and apparatus are provided for silent alarm channels using one-time passcode authentication tokens. According to one aspect of the invention, a message is transmitted indicating a potential attack on a protected resource by obtaining the message; combining the message with a tokencode generated by a security token to generate a one-time passcode; and transmitting the one-time passcode to a receiver. The tokencode can be based on a secret shared between the security token and an authentication authority. The message can be encoded into a codeword c using a codebook C. The codeword c and the tokencode can be combined to generate the one-time passcode.

The message can comprise, for example, a one-bit message indicating whether the protected resource has been attacked. The one-bit message can be encoded as n-bits, and the n-bits can be compressed to l bits. The compression can apply, for example, a hash function to the n-bits, or a dot product function to the n-bits with a random bit vector of size n, wherein the dot product function is defined over binary strings of size n.

According to a further aspect of the invention, a plurality of the messages are obtained in parallel, and the plurality of parallel messages are combined with the tokencode to generate the one-time passcode. According to another aspect of the invention, a subsequent message is generated by applying a hash function to a prior n-bit value to provide a counter identifying each message. According to yet another aspect of the invention, the message further comprises one or more additional bits to provide an annotation of the message.

The authentication and communication techniques of the illustrative embodiments overcome one or more of the problems associated with the conventional techniques described previously, and permit devices to securely transmit messages over a silent alarm channel using one-time passcode authentication tokens. Moreover, no modification of the applications or communication protocols is required. These and other features and advantages of the present invention will become more readily apparent from the accompanying drawings and the following detailed description.

DETAILED DESCRIPTION

The present invention provides methods and apparatus for implementing silent alarm channels using one-time passcode authentication tokens. The disclosed silent alarm channels, for example, can signal an intrusion after an attacker has compromised a device. As used herein, a silent alarm is a cryptographically protected channel between a potentially compromised device and a trustworthy log-collection point or server. The cryptographically protected channel carries a message that is persistent and stealthy (i.e., an undetectable message that may be read for a long period of time). Thus, even after compromising a device, an attacker cannot determine whether there is a message in the channel and cannot block the channel without being detected. In one exemplary implementation, the transmitting device itself does not know whether it is transmitting an alert over the channel.

According to one aspect of the invention, a silent alarm channel (SAC) is implemented over a one-time passcode authentication token. In this manner, an efficient silent alarm channel can be provided over an underlying low-bandwidth elementary channel imposed by the one-time passcodes that are generated by a possibly resource-constrained (software or hardware) token and sent by the token to a receiving authentication server. According to a further aspect of the invention, the disclosed silent alarm channels can transmit, through the passcodes typed by the user possessing the token, values that are derived by a monotonically increasing counter where the transmission of a new counter value is lossy, yet reliable and stealthy in the following sense:

Any counter-value transition from value i to value i+j, j>0, is probabilistically detected based on O(j) passcodes by the receiver with high probability;

Any counter-value transition that is detected by the receiver has actually taken place in the token;

No counter value can be learned and no counter-value transition can be detected by an attacker that observes the underlying elementary channel (over transmitted passcodes) even if the attacker fully compromises the token.

According to further aspects of the invention, the following different versions of the silent alarm channel are disclosed based on the monotonic counter, each satisfying different application needs:

1. A non-invertible state-transition signal for capturing a one-time flag-raising or bit-flip event;
2. A k-bit extension of the non-invertible state-transition signal for capturing one or more monotonic state transitions to one of $2^{k-1}$ hierarchically ordered new states;
3. A l-step extension for the non-invertible state-transition signal for capturing up to l, consecutive or performed at-once monotonic state transitions to one of l ordered new states;
4. An extra-bits extension for the non-invertible state-transition signal for annotating state transitions with extra bits of information.

Using one or any combination of the above versions, SAC-enabled tokens can communicate important security-related, status-update or health-monitoring information from the token back to the server, thus enabling the immediate detection of whether the token has been compromised by an attacker or otherwise assess the security posture of the token. Designing and incorporating a SAC scheme into a one-time passcode authentication token poses many challenges that existing SAC schemes fail to address. The disclosed token-specific SAC constructions implement SAC functionality in bandwidth- and storage-limited settings that tokens operate in.

Generally, silent alarms build on two components: (1) Authenticated Encryption; and (2) Forward-Secure Pseudo-Random Number Generators (FS-PRNGs). It is noted that public-key-based variants are also possible, as would be apparent to a person of ordinary skill in the art.

Figure 1:
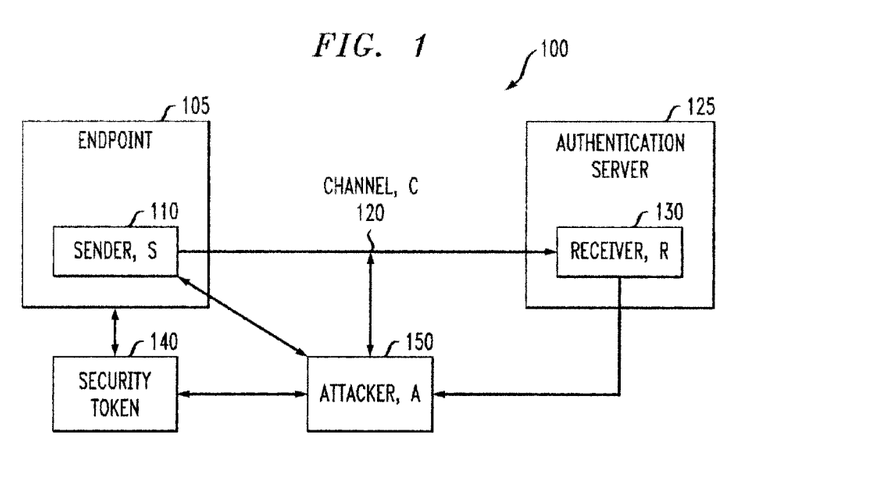
FIG. 1 illustrates an exemplary network environment in which the present invention can operate.

FIG. 1 illustrates a network environment where the present invention can be employed. As shown in FIG. 1, a sender S (110) and a receiver R (130) communicate through a channel 120 that is used to transmit messages from S to R. In the exemplary embodiment, the sender S (110) is part of an endpoint 105 and the receiver R (130) is part of an authentication server 125. The authentication server 125 may be provided, for example, by an authentication authority. Silent alarms correspond to a specific channel 120 that may be compromised by an adversary or attacker A 150 (FIG. 1).

Generally, the endpoint 105 can use a silent alarm channel to create status-update reports that alert a trusted receiver 130 to a potential, impending compromise. Even after an adversary A has compromised the device 105, the warning produced by a silent alarm persists in the channel 120. Moreover, the adversary cannot learn or modify the warning, or even detect whether one exists in the channel 120. An adversary A that fully controls the device 105 can at best suppress the channel 120, but at the cost of directly revealing its presence.

Figure 2A:
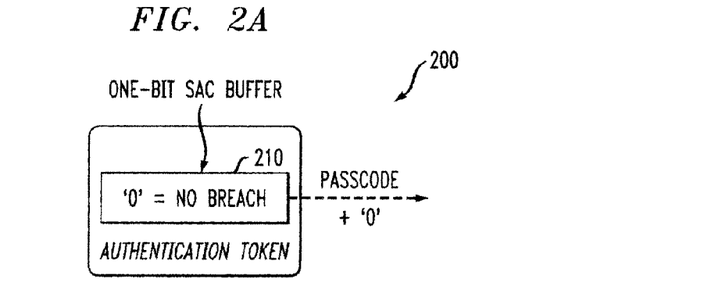
FIGS. 2A and 2B illustrate a silent alarm channel in accordance with an aspect of the present invention.
Figure 2B:
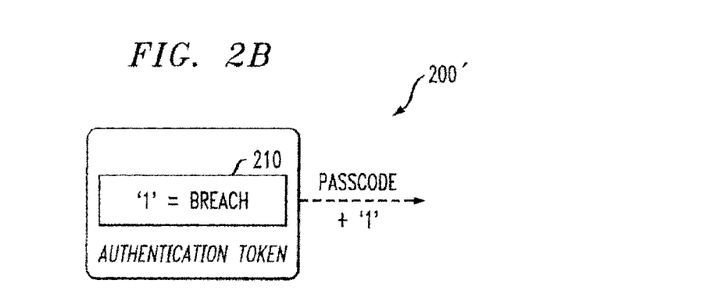

U.S. patent application Ser. No. 13/249,957, filed Sep. 30, 2011, entitled "Methods and Apparatus for Secure and Reliable Transmission of Messages Over a Silent Alarm Channel," now U.S. Pat. No. 8,788,817, incorporated by reference herein, presents silent alarms as a cryptographic primitive that strictly extends the properties of classical secure or forward-secure channels. A general construction is disclosed based on two layers of authenticated encryption over a fixed-size alert-storing buffer, as discussed further below in conjunction with FIG. 2. In particular, this general construction implements a silent alarm scheme, also referred to as a SAC scheme, that comprises a number of components and algorithms run at a sender S and a corresponding receiver R.

As previously indicated, the present invention implements silent alarm channels using one-time passcode authentication tokens (either hardware-based or software-based tokens). In an exemplary implementation, a user of endpoint 105 may authenticate with an authentication server 125 using a one-time passcode generated by a security token generator 140 (hereinafter, referred to as security token) before obtaining access to a protected resource, in a known manner.

The security token 140 can be, for example, separate from and electrically connected to the endpoint 105. The security token 140 may be implemented, for example, using the RSA SecurID® user authentication token commercially available from RSA Security Inc. of Bedford, Mass., U.S.A. The security token 140 may be a server or other type of module that is accessible over a network, or it may be a software component resident on the endpoint device 105. As another alternative, token 140 may be distributed over multiple devices, one of which may be the endpoint device 105. Thus, while the present invention is illustrated herein using a security token 140 electrically connected to the endpoint device 105, such that the endpoint device 105 can read a given token code (or another authentication value) directly from the token 140, other implementations are within the scope of the present invention, as would be apparent to a person of ordinary skill in the art. For example, for other security tokens 140 that are not connectable to a computer or other user device in this manner, the user may manually enter a password or another value displayed by the token 140 at the time of the attempted access. In addition, for a detailed discussion of a modular and/or component implementation of a token-based authentication technique, see, for example, U.S. Pat. No. 7,562,221 to Nyström et al., assigned to the assignee of the present invention and incorporated by reference herein In one exemplary implementation, the sender S maintains a secret key σ and a buffer B of some fixed size T indexed by the current-slot integer I, 0≤I≤T−1, that defines the location in the buffer B at which a new alert message will be written, and that is randomly initialized.

In accordance with forward secure logging aspects of silent alarms, the messages are (sequentially) signed in a chain by a write algorithm, prior to the encapsulation of the data by a wrap algorithm.

The sender S writes a message m in the buffer B by first authenticated encryption of m to c, using a secret key, σ, and then inserting c at position I of B (overwriting the current content). The index I is increased by 1 (modulo T) so that authenticated encryption messages are inserted in B in a round-robin fashion.

Periodically or on demand (through requests coming from the receiver), the sender S wraps the buffer B by authenticated encryption of B to C, using a secret key, σ, and sends the ciphertext C over a network to the receiver R.

The receiver R reads a received ciphertext C by first decrypting C to buffer B (using the corresponding secret key) and verifying B, and then by decrypting each ciphertext c contained in B to m (using the corresponding secret key) and verifying m.

The sender S and receiver R make use of a secret-key authenticated encryption scheme, where each time the scheme is employed using a new one-time secret key. That is, secret keys evolve over time and they can be (re) constructed both by the sender and the receiver. For a description of a suitable authenticated encryption scheme, see, for example, M. Bellare and C. Namprempre, "Authenticated Encryption: Relations Among Notions and Analysis of the Generic Composition Paradigm," J. Cryptology, 21, 469-91 (September 2008), incorporated by reference herein.

Secret keys evolve in a forward-secure way by making use of a forward-secure pseudorandom number generator (FS-PRNG), where the initial seed is known initially by both the sender S and the receiver R. The FS-PRNG may be implemented, for example, in accordance with the teachings of U.S. patent application Ser. No. 13/334,709, filed Dec. 22, 2011, entitled "Methods and Apparatus for Generating Forward Secure Pseudorandom Numbers;" and/or G. Itkis, "Handbook of Information Security, chapter Forward Security: Adaptive Cryptography—Time Evolution," (2006, John Wiley and Sons), each incorporated by reference herein. Generally, forward security enforces an important additional property according to which any dependencies among the secret states are cryptographically protected in the backward direction: the new secret state is derived by the current state in a one-way fashion, so that the former does not compromise the latter and, therefore, a given state does not compromise any of the older states. In other words, once replaced (and erased by the system) a secret state remains secure in the forward direction, i.e., any replaced secret state is cryptographically protected, and infeasible to compromise, indefinitely in the future.

Based on the use of a fixed-size buffer B and two layers of authenticated encryption, silent alarm channels are robust against adversaries A capable of (a) tapping the channel 120 at all times prior to the compromise, (b) stealing the full state of sender S at the time of the compromise, and (c) learning the reaction of the receiver to silent alarm warnings at all times, prior to or after the compromise.

Intrusion Detection in Authentication Tokens Via Silent Alarms

As indicated above, aspects of the present invention apply silent alarms to authentication tokens 140, such as SecurID™. It is again noted that these tokens 140 are available in both a standalone hardware format (as a small fob) and a software application for mobile phones. They generate one-time passcodes, sequences of (typically eight) decimal digits. A user transcribes a passcode from a token display to another endpoint device 105, e.g., a laptop, to authenticate to a remote service, e.g., a VPN.

Authentication tokens contain secret cryptographic keys for passcode generation. These are symmetric keys shared with a passcode-receiving authentication server. An attacker A that can compromise a user's token 140 and extract its key can clone it, producing a logically indistinguishable duplicate that allows the attacker A to impersonate the user. During a "lunchtime" attack against a hardware token 140, for instance, an adversary A might break open a user's hardware token, extract the key, and then stealthily replace the token 140 to avoid arousing suspicion. Against a software token 140, remote attack is possible via, e.g., key-extracting malware.

One possible countermeasure on detecting intrusion into a token is to "zeroize" its key, i.e., disabling the token. But this approach means that security administrators never learn of attempted attacks.

A silent alarm system allows a token 140 to alert an authentication server to an intrusion attempt, enabling security administrators to monitor and respond to attacks.

FIGS. 2A and 2B illustrate a silent alarm channel 200 in accordance with an aspect of the present invention. The exemplary silent alarm channel 200 buffers a single, one-bit message, referred to as a "breach attempt" flag 210. As shown in FIG. 2A, prior to a compromise by an attacker, the exemplary one-bit breach attempt flag 210 is set to a binary value of zero (0) to indicate that a breach has not occurred. After a breach, the exemplary one-bit breach attempt flag 210 is set to a binary value of one (1) to indicate that a breach has occurred, as shown in FIG. 2B. As shown in FIGS. 2A and 2B, the exemplary one-bit breach attempt flag 210 is transmitted by the token 140 together with the passcode, as discussed further below.

The stealthy nature of a SAC means that even a strong attacker, one that observes passcodes before breaching a token 140, and then learns the full internal state of the token 140, can't tell whether the "breach attempt" flag 210 has been raised. An authentication attempt with a cloned token 140 can be accepted as valid (in reality or in appearance), and administrators can then clandestinely monitor an attacker A.

In a hardware token 140, a flag might be raised, for example, in response to a physical attempt at tampering (e.g., a broken electrical contact). In a software token 140, there are a wide range of possible triggers, e.g., Tripwire-style detection of token code modification.

TECHNICAL CHALLENGES

As previously indicated, authentication tokens 140 have tight resource and user constraints that pose several considerable challenges:

1. Low bandwidth: The only transmission channel in an authentication token 140 is the one-time passcodes themselves. A software token can in principle transmit through other channels, e.g., SMS, but not without notifying an attacker or sending periodic, null messages. Embedding a silent alarm channel 200 in passcodes, however, erodes the strength of the passcodes: Every bit coopted for a silent alarm channel reduces the passcode space by a factor of two. Consequently, only a few bits of bandwidth are useable in practice.

2. Lossy channel: Typically, authentication tokens 140 generate a new passcode once a minute. The only time a passcode reaches a server, however, is when a user authenticates, which happens relatively rarely. In this view, the channel from the token 140 to the server is highly lossy.

3. Human transcription errors: Typing errors are common in the transmission of one-time passcodes. If a silent alarm channel is naïvely embedded in passcodes (e.g., in, say, the least significant bit) a typographical error would, with non-negligible probability, erroneously raise a "breach attempt" flag (while maintaining a valid passcode).

4. Catch-up costs: It is very common that users make use of their tokens only infrequently with respect to the frequent minute-based rate with which passcodes are normally, i.e., at full operation, being produced at the tokens. Indeed, a typical user will make use of the token at most 2-3 times a day, whereas many users will not make use of their tokens for days or even weeks. The forward-secure pseudorandom number generator (FS-PRNG) should guarantee that the "catch-up" cost, i.e., the cost to produce the new correct secret key that corresponds to a step in the sequence of produced keys of days or even weeks, will be small.

The exemplary implementation of the invention recognizes that only a few bits of bandwidth are available for the silent alarm channel. In addition, the passcodes themselves are short decimal strings.

To ensure the security of our SAC scheme, authenticated-encryption schemes for the low layer, i.e., for buffered messages 200, are described below in a section entitled "Low-Layer Authenticated Encryption," and for the high layer, i.e., transmission in passcodes from token 140 to the server 125 are described below in a section entitled "High-Layer Authenticated Encryption." Additionally, to address the low-bandwidth and lossy-channel challenges, it is shown how a message in the low layer can be probabilistically compressed to meet the tight bandwidth constraints of the token setting in a section entitled "Compressing Low-Layer Ciphertext ρ." A codebook-based robust auxiliary channel is implemented over one-time passcodes, using techniques described in U.S. patent application Ser. No. 13/404,780, entitled "Methods and Apparatus for Embedding Auxiliary Information in One-Time Passcode Authentication Tokens," now U.S. Pat. No. 8,984,609, incorporated by reference herein.

Non-Invertible State Transition Signal Construction

Figure 3:
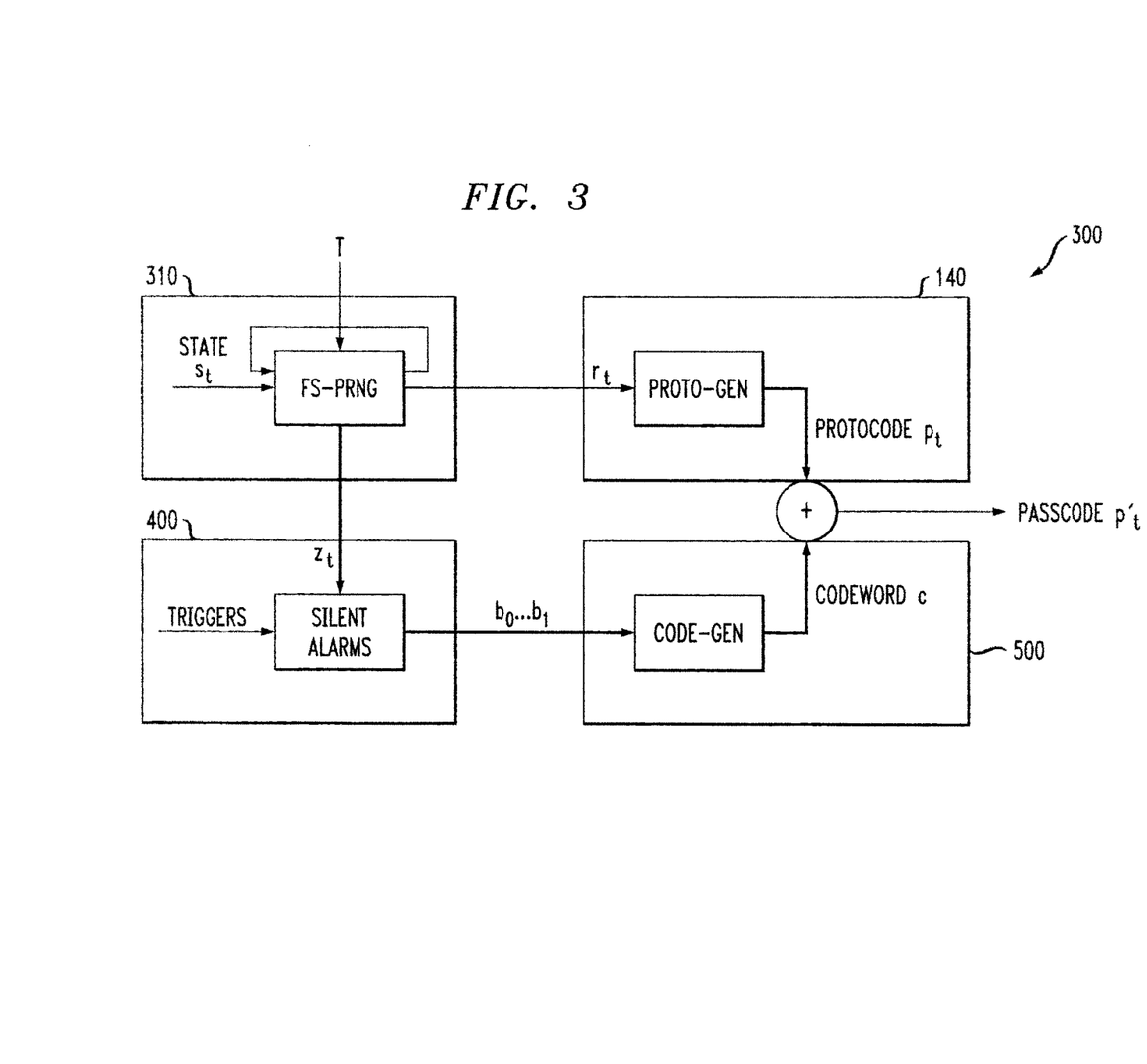
FIG. 3 is a block diagram of an exemplary silent alarm system in accordance with aspects of the present invention.

FIG. 3 is a block diagram of an exemplary silent alarm system 300 in accordance with aspects of the present invention. As shown in FIG. 3, the exemplary silent alarm system 300 comprises a forward security module 310, a protocode generation module 140 (also referred to as a security token generator 140), a silent alarm module 400, as discussed further below in conjunction with FIG. 4, and an auxiliary channel 500, as discussed further below in conjunction with FIG. 5.

Figure 4:
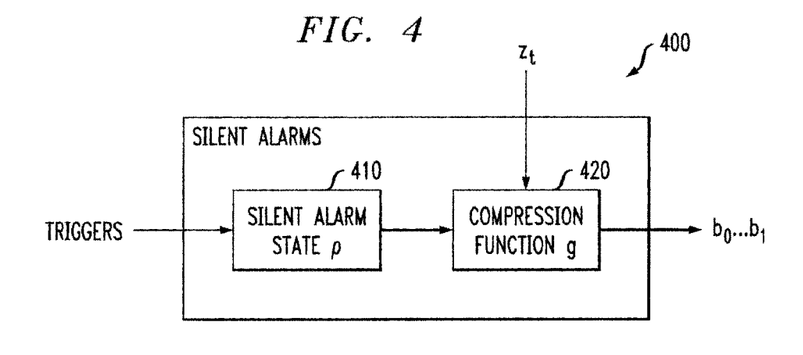
FIG. 4 is a block diagram of an exemplary silent alarm module of FIG. 3.

Generally, given an initial state, $s_t$, the forward security module 310 generates two pseudo-random numbers, $r_t$ and $z_t$, used by the protocode generation module 140 and silent alarm module 400, respectively. The forward security module 310 may be implemented, for example, in accordance with the teachings of U.S. patent application Ser. No. 13/334,709, filed Dec. 22, 2011, entitled "Methods and Apparatus for Generating Forward Secure Pseudorandom Numbers," now U.S. Pat. No. 9,008,303; and/or G. Itkis, "Handbook of Information Security, chapter Forward Security: Adaptive Cryptography—Time Evolution," (2006, John Wiley and Sons), each incorporated by reference herein.

FIG. 4 is a block diagram of an exemplary silent alarm module 400 of FIG. 3. As shown in FIG. 4, the silent alarm module 400 comprises a silent alarm state generator 410 and a compression function 420. As discussed hereinafter, the silent alarm state generator 410 performs a low-layer authenticated encryption and the compression function 420 compresses the low-layer ciphertext.

As discussed further below in conjunction with FIG. 5, the exemplary silent alarm system 300 of FIG. 3 comprises an auxiliary channel 500 for performing a high-layer authenticated encryption.

Low-Layer Authenticated Encryption by Silent Alarm State Generator 410

For encrypted authentication of messages within the buffer B (210), an exemplary scheme on a one-bit message is employed. In this scheme, a ciphertext is a $\rho \in \{0,1\}^n$, where n is a security parameter. In this manner, a two-state message (e.g., "Ok" or "Attack") can be sent by the token 140 to the authentication server 125, denoting whether the token 140 has been physically compromised. It is again noted that the alert messages on the silent alarm channel are secure, undetectable and persistent.

A token 140 is initialized with a random, secret bitstring $\rho_0 \in \{0,1\}^n$ shared with the server 125. The bitstring $\rho_0 \in \{0,1\}^n$ represents an n-bit encoding by the silent alarm state generator 410 of a '0' bit (indicating that the token is "Ok."). A '1' bit may be encoded by the silent alarm state generator 410 as any other bitstring, i.e., an arbitrary $\rho_1 \in \{0,1\}^n - \{\rho_0\}$ (i.e., "Attack" is encoded as $\rho_1$, any random value that is not equal to $\rho_0$).

In this manner, the silent alarm state ρ provides authenticated encryption. Authentication is provided since $\rho_0$ is random and secret, and the alarm cannot be turned off. Encryption is provided since $\rho_0$ and $\rho_1$ are random and secret, and the alarm cannot be detected.

This exemplary scheme provides one-time-pad-type confidentiality: Without knowledge of $\rho_0$, an adversary A theoretically cannot determine if a bitstring $\rho \in \{0,1\}^n$ represents a '0' or '1'.

This scheme provides biased authentication. The adversary A can create a valid ciphertext on a '1' bit with overwhelming probability by choosing a random string in $\{0,1\}^n$. But the adversary A can only create a valid ciphertext on '0' with probability $2^{-n}$. This bias captures the desired property in the disclosed scheme: To raise the "breach attempt" flag 210, it suffices to replace $\rho_0$ with a random string. But lowering the flag is hard. This ensures persistence in the full scheme.

This scheme requires minimal computation, and is forward-secure provided that $\rho_1$ is generated from a source of true randomness or forward-secure pseudorandomness.

To encode a multi-bit message, parallel instances of the above scheme can be created. Note that n can be any desired length.

An additional, key property of this scheme is that it is possible probabilistically to compress the string $\rho \in \{0,1\}^n$, as discussed hereinafter.

Compressing Low-Layer Ciphertext ρ by Compression Function 420

As previously indicated the compression function 420 compresses the n-bit low-layer cipher ρ generated by the silent alarm state generator 410 to an l-bit message m, where l<<n. The security parameter n determines the strength of the authenticated-encryption scheme for a ciphertext ρ on a message m in the low layer. Thus, the larger the value of n, the stronger the scheme. Again, however, the silent alarm channel provides only a few bits of bandwidth, i.e., it restricts m to be of very few bits. It is now shown how to achieve a seeming contradiction, namely, the transmission of a relatively long ciphertext ρ as a compact, l-bit message m, i.e., how to achieve l=r.

Let $m = g_{z_t}(\rho)$, where $g: \{0,1\}^n \to \{0,1\}^l$ is a universal hash function (UHF) under key $z_t$. The key $z_t$ is a time-varying key shared by the token 140 and server (generated, e.g., as an independent output of the FS-PRNG). The server can easily test the condition $$\rho \stackrel{?}{=} \rho_0.$$

Because g is a UHF, with high probability over $z_t$ ($1-2^{-l}$ for a good UHF), if $\rho \neq \rho_0$, then $g(\rho) \neq g(\rho_0)$.

Alternatively, and in order to achieve better performance both in terms of time complexity and in terms of bandwidth consumption, a hash function of weaker collision-resistance property can be used: let $m = g(\rho, z_t)$, where $g: \{0,1\}^n \times \{0,1\}^n \to \{0,1\}^1$ is the dot product function defined over binary strings (vectors) of size n. Here again, $z_t$ is a time-varying mask key shared by the token and server (generated, e.g., as an independent output of the FS-PRNG). Thus, message m is a parity bit that can be viewed as a one-bit hash value. Note that again, the server 125 can test the condition $$\rho \stackrel{?}{=} \rho_0,$$

this time probabilistically, by checking whether $$m = g(\rho, z_t) \stackrel{?}{\neq} g(\rho_0, z_t).$$

Indeed, this verification test offers substantially perfect soundness but imperfect (one-sided error) correctness: if $m = g(\rho, z_t) \neq g(\rho_0, z_t)$ then it must be that $\rho \neq \rho_0$; if $m =_g (\rho, z_t) = g(\rho_0, z_t)$ instead (an event which happens with probability ½), then it is not necessarily the case that $\rho = \rho_0$. In this case, the receiver must wait for the next transmission to overall increase its detection probability (within the first 2 transmissions) of the fact that $\rho \neq \rho_0$ to ¾.

Funkspiel schemes involve a slightly different construction, in which ρ is not secret. Instead a valid PRNG state encodes a '0' and an invalid one encodes a and $m = MAC_{z_t}[\rho]$. The disclosed construction better matches the general silent alarm channel framework, and also requires less computation, as it doesn't need both a PRNG and a MAC. See, for example, Johan Hastad et al., "Funkspiel Schemes: An Alternative to Conventional Tamper Resistance," CCS '00, Proc. of the 7th ACM Conf. on Computer and Communications Security, 125-133 (2000), incorporated by reference herein. Generally, Funkspiel schemes effectively permit only a one-time, one-bit message.

High-Layer Authenticated Encryption

As previously indicated, the exemplary silent alarm system 300 of FIG. 3 comprises an auxiliary channel 500 for performing a high-layer authenticated encryption. FIG. 5 is a block diagram of an exemplary auxiliary channel 500 of FIG. 3.

Suppose that $p_t$ is a passcode generated for time (e.g., minute) t in a forward-secure manner, i.e., $p_t$ is derived from FS-PRNG output r. Let m be the l-bit message for transmission in the SAC. Let $D_k$ denote the set of k-decimal digit strings.

It would be possible in principle to construct a passcode $p_t'$ via authenticated encryption of m under key $r_t$ in the domain $D_k$. There are a few complications, though. Small-domain encryption with tight security bounds tends to be inefficient, a particular problem in constrained devices. The additional requirements of authentication and formatting within $D_k$ (via format-preserving encryption or some related mechanism) would, in fact, require the creation of a new cipher. An additional complication, however, is human-transcription error. With non-negligible probability (with 0.0008% probability for an eight-digit passcode), ciphertexts on messages m and m' will differ in only one digit. Thus, a mistyped digit can corrupt the message in a silent alarm channel. Over time, in a large population of users, this can result in many false "breach attempts."

An exemplary implementation of the present invention employs an authenticated-encryption scheme in which the authentication mechanism provides error detection, and thus provides robustness to typographical errors as a secondary feature.

The high-layer construction encodes an l-bit silent alarm message m as a codeword c in an error-correcting code with codebook $C \subseteq D_k$ of l bits, i.e., $|C| = 2^l$.

Figure 5:
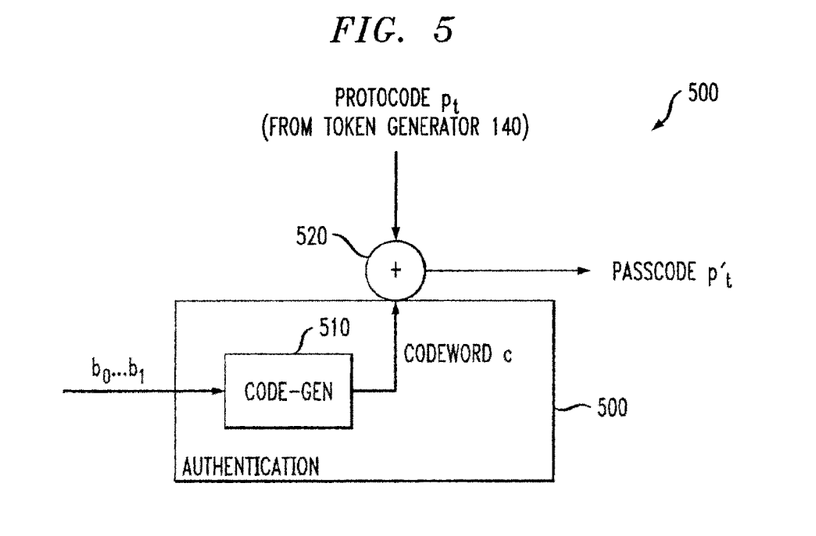
FIG. 5 is a block diagram of an exemplary auxiliary channel of FIG. 3.

As shown in FIG. 5, the auxiliary channel 500 comprises a code generator 510 that employs the codebook C to process the l-bit message m (b0 . . . b1) generated by the compression function 420 of FIG. 4 and generates the codeword c. For example, each message m can be mapped to a codeword c in the codebook C. This codeword c is combined by an adder 520 with $p_t$ to produce an enhanced, displayed passcode $p_t'$. More precisely, the passcode $p_t$ and codeword c are combined by an adder 520 via a symbolwise group operation $\oplus$ over $D_k$, e.g., digitwise addition mod 10. The token 140 thus displays $p_t' = p_t \oplus c$.

The auxiliary channel 500 provides authenticated encryption of the compressed message m to $p_t'$. The authentication comes from the fact that the secret codebook C serves as a MAC and the encryption comes from the fact that the secret protocode $p_t$ serves as a one-time pad. The authentication server 125, which can independently generate $p_t$ and knows C, can then extract c and decode in.

Because the codebook C is constructed as an error-correcting code, it helps ensure that a typographical error results in passcode rejection, rather than corruption of the silent alarm message m. Given minimum distance δ, defined as the Hamming Distance over $D_k$, up to $\lceil \delta/2 \rceil$ mistyped digits will result in an invalid codeword.

The codebook C must also be generated as a secret shared by the token 140 and server, i.e., drawn from a space C of valid codebooks with minimum distance δ. In this case, the codebook also authenticates the message m. A related approach of combining of error-correcting codes (which are good universal hash functions) and PRFs is a standard way of building message-authentication codes. Without knowledge of C, with high probability, an adversary A cannot corrupt a silent alarm channel message m to produce a valid message m'. (The strength of this authentication scheme depends upon the minimum distance of C. Precise analysis lies outside the scope of this paper.)

As $p_t$ is derived from FS-PRNG output, $p_t'$ is a forward-secure encryption of the codeword c.

As noted above, this construction (by diverting bandwidth from passcodes to the SAC) produces a loss in underlying passcode strength: A randomly selected passcode will be valid with probability $|C|/10^k$.

Example Parameterization.

Consider the construction of a two-bit silent alarm channel for transmission of ρ. A codebook of the form C={aaaaaaaa,aaaabbbb,bbbbaaaa,bbbbbbbb} has a minimum distance δ=4, and thus can tolerate up to two typographical errors.

This codebook C may be randomly selected as a shared token-server secret from a codebook space C representing all possible a,b∈$D_1$ such that a≠b. An adversary A can then successfully modify a message in the SAC channel with probability at most ⅕. By guessing the value x=a−b mod 10, and given a message m encoded as bbbbbbbb in a passcode $p_t'$, for instance, the adversary can compute $p_t^* = p_t^* +$ xxxx0000. This $p_t^*$ is valid passcode with message $m^*$ encoded as aaaabbbb. C is chosen for simplicity: Larger codebook spaces for δ=4, and thus stronger authentication are possible.

One-Time Passcode Tokens

Hardware tokens that generate one-time passcodes, such as RSA SecurID® one-time passcodes, (see, e.g., RSA, The Security Division of EMC, RSA Hardware Authenticators Product Description. http://www.rsa.com/node.aspx?id=1158, 2011, incorporated by reference herein, are common in enterprise settings. The present invention recognizes that silent alarms embedded in passcodes can be used as a form of tamper detection. If an attempt of physical compromise is detected, such as the token case being opened, the alarm is triggered. Note that persistence is a key property here, as not all passcodes flow from token to server. For instance, time-based tokens generate a new passcode every minute, while users generally log in at most a few times a day.

Consider a hardware token that is used to derive one-time passwords for authentication purposes. If the token is lost and gets tampered with, a silent alarm can be used to send a one-bit message, e.g., a red flag, denoting that the token has been compromised. Here, a sensor that detects physical tampering with the token triggers a signal that changes the state of the token: this corresponds to adding a red-flag message in the size-one buffer of the token. Due to stealthiness, the attacker cannot infer that this has taken place; therefore, by piggybacking this red-flag message with the next password that is used by the attacker and sent to the authentication server, the server is able to detect that tampering took place and accordingly take the necessary actions (e.g., to deny access to critical operations and, if possible, to even proceed with the recovery of the attacker).

Extensions of Non-Invertible State Transition Signal Construction k-Bit Extension Under an assumption that the compression function g is instantiated to be the dot product function, i.e., m is a single bit, a k-bit extension can be implemented by simply running in parallel k instantiations of the single bit construction described above.

Figure 6:
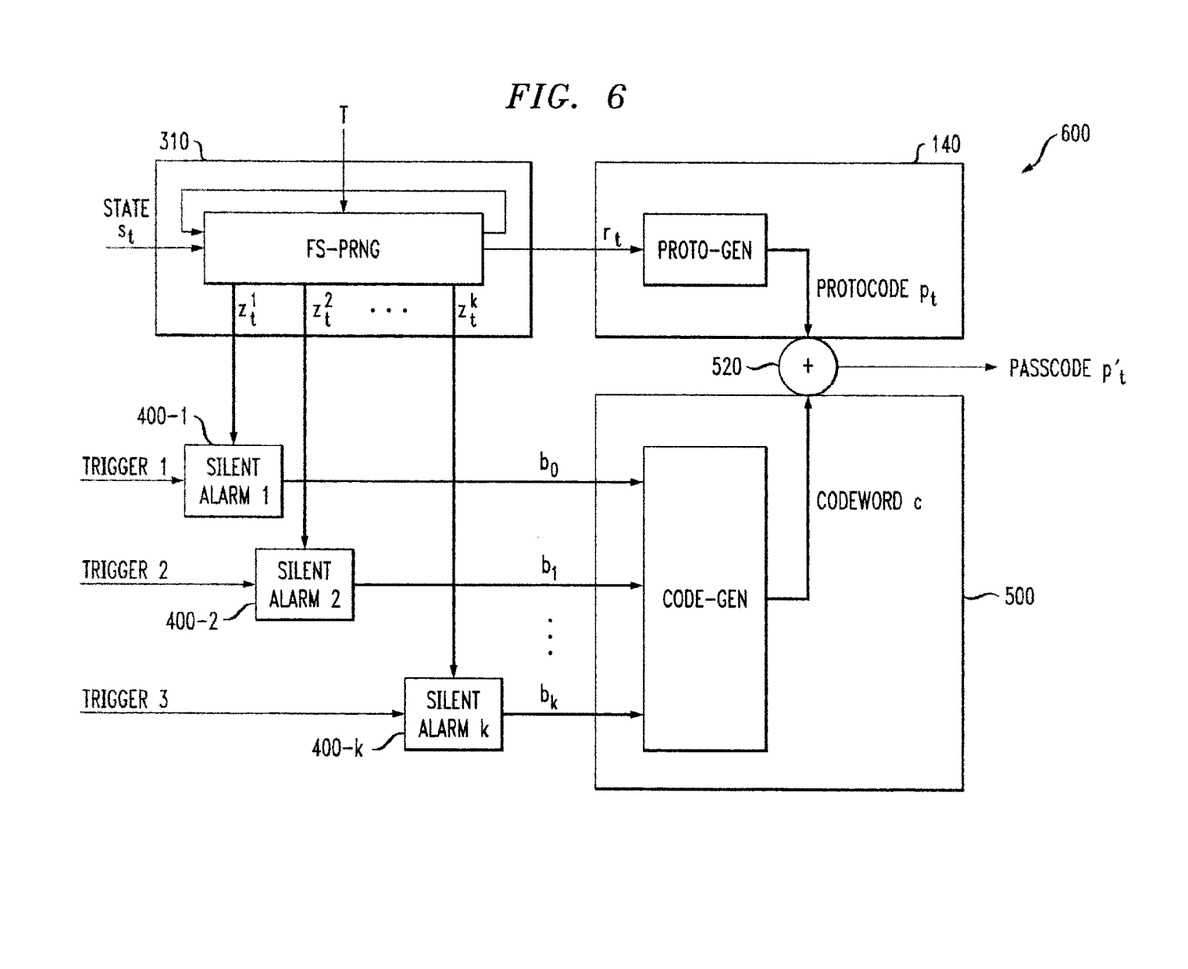
FIG. 6 is a block diagram of an exemplary silent alarm system in accordance with a first extension of the silent alarm system of FIG. 3.

FIG. 6 is a block diagram of an exemplary silent alarm system 600 in accordance with a first extension of the silent alarm system 300 of FIG. 3. As shown in FIG. 6, the exemplary silent alarm system 600 comprises a forward security module 310, a protocode generation module 140 (also referred to as a security token generator 140), k-parallel silent alarm modules 400-1 through 400-k, each as discussed above in conjunction with FIG. 4, and an auxiliary channel 500, as discussed above in conjunction with FIG. 5. As used herein, a protocode is also referred to as a tokencode.

In this manner, there are k individual bits $b_0$ through $b_k$ that are initialized to 0 and where each bit can be independently set to 1 (each separately implementing the low-layer authenticated encryption). The silent alarm channel scheme can then transmit the current values of these k bits using the high-layer authenticated encryption: for instance, assuming that k is equal to the dimension l of the underlying codebook C.

In this case, if for instance k=4, silent alarm alert messages can be communicated that starting from an initial 0000 state can monotonically increase to one of the states in {1000,0100,0010,0001} (in one step), or to one of the states in {1100,1010,1001,0110,0101,0011} (in two steps), or to one of the states in {1110,1101,1011,0111} (in three steps), and finally to state 1111 (in four steps).

The higher the hamming distance of the new state from the initial state 0000 the stronger the signal it carries, in the sense that the receiver R is more likely to detect that an individual bit has been flipped from the initial 0 state. This is an important feature that can be very beneficial for more effectively encoding events that trigger the silent alarm alerts to concrete state transitions.

1-Step Extension

Suppose that the transition from $\rho_0$ to $\rho_1$ is generated based on a forward-secure mechanism that can be reproduced by the login server. Initially, the server 125 knows $\rho_0$ (since it has been generated by a forward secure method based on an initial seed) and the server 125 is also able to reproduce $\rho_t$ (by assumption). So, if the server detects a message m embedded in a passcode that is inconsistent with $\rho_0$, then the server 125 knows that the token's state (if it has not been broken into) has changed to $\rho_1$. In other words, the server 125 knows the exact value of the new token state.

If the transition from $\rho_0$ to $\rho_t$ uses a small number of truly random bits, say r bits, then the server knows that $\rho_t$ is one out of 2 possible values. Since O(r) passcodes embed O(r) parity bits that correspond to O(r) linear equations involving $\rho_1$, it is possible to eliminate (on average) all possible values except for the new state $\rho_1$. So, with some probabilistic delay, the server 125 will be synchronized to the new token state after O(r) logins.

These observations are used to construct a silent monotonic counter. Let $\rho_{i+1}=h(\rho_i, x_i)$ where $h:\{0,1\}^n \times \{0,1\}^r \to \{0,1\}^n$ is a universal (one-way) hash function and $x_i$ are bits the token wishes to transmit to the server. $h(\rho_i)$ is written if there is no additional input, that is, r=0.

For r=0, the sequence is $\rho_0$, $\rho_1=h(\rho_0)$, $\rho_2=h(\rho_1)$, etc. The token 140 can use this sequence as a silent monotonic counter. Whenever the token 140 increments the counter, the server 125 is able to synchronize by checking inconsistencies. For example, suppose that the server's current estimate of the token's counter value is $\rho_i$ and suppose that the token 140 has in the meantime increased the counter to $\rho_{i+j}$. If the server 125 receives a passcode embedded message (parity bit) inconsistent with $\rho_i, \rho_{i+1}, \ldots, \rho_{u-1}$ but consistent with $\rho_u$ for some u>i, then the server increments its estimate of the token's counter to $\rho_u$. (Notice that even if inconsistency with $\rho_{u+1}$ can be detected, this is not useful in future computations.) This procedure synchronizes the server with the token after O(j) receives passcodes with high probability.

Thus, each subsequent ρ value is a hash of the prior ρ value. In this manner, the server 125 can see if the received value has changed, and the server 125 knows what to expect (Server 125 knows any new state is a hash of the prior state). The server 125 can now detect how many triggers have occurred. The counter can be incremented to each new state to signal many transitions.

Figure 7:
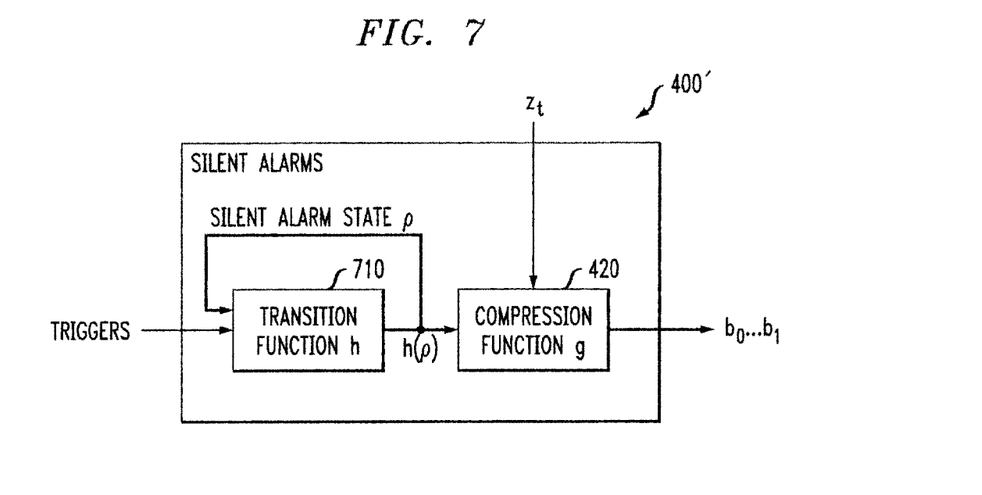
FIG. 7 is a block diagram of an exemplary alternate implementation of the silent alarm module of FIG. 4.

FIG. 7 is a block diagram of an exemplary alternate implementation 400' of the silent alarm module 400 of FIG. 4. As shown in FIG. 7, the exemplary alternate silent alarm module 400' comprises a transition function h 710 and the compression function 420. As shown in FIG. 7, the transition function h 710 applies a one-way hash function h on the current ρ value to generate h(ρ). The output of the transition function h 710 is applied to the compression function 420, which operates as discussed above in conjunction with FIG. 4.

If two silent monotonic counters are used, then the first counter can be used to reset the second counter as follows: $\rho_{i+1,0} = h(\rho_{i,0})$ as before, and a second counter $\rho_{i,j+1} = h'(\rho_{i,j})$ where h' is a second universal (one-way) hash function. The combined counter state at the token 140 and server is always of the form $$(\rho_{i+1,0}, \rho_{i,j+1}) \text{ for some } i,j \geq 0.$$

To increment the second counter, the token increments $\rho_{i,j}$ to $\rho_{i,j+1}$ by evaluating h'. To reset the second counter, the token increments $\rho_{i+1,0}$ to $\rho_{i+2,0}$ by evaluating h and also to $\rho_{i+1,1}$ by evaluating h' on $\rho_{i+1,0}$: the new combined counter state is the pair $(\rho_{i+2,0}, \rho_{i+1,1})$ When the server receives a passcode, it uses the embedded parity bits to first synchronize the first counter after which the second counter is being synchronized.

It is noted that more complex hash tree structures can be used.

Extra-Bits Extension

Multiple bits can be transmitted within one silent alarm state by using the $x_i$ in $\rho_{i+1} = h(\rho_i, x_i)$. The embedded extra bits $x_i$ in the silent alarm state transition function h can be used, for example, to annotate state transitions with additional bits of information.

As discussed hereinafter, the server 125 determines $x_i$ by an exhaustive search through all possible $x_i$ values and finding the correct $x_i$ value by verifying the new state $\rho_{i+1} = h(\rho_i, x_i)$ In other words, if $x_i$ has r bits, then an exhaustive search based on r passwords is necessary to identify $x_i$. In order to avoid an exhaustive search, use $$\rho_{i+1} = \text{XOR}_{b=1}^{r} x_{i,b}(\rho_i \| j)$$

where $x_{i,b}$ is the b-th bit in the bit string $x_i$. This leads to a set of linear equations that can be solved in linear O(r) time by the server.

As soon as the server 125 gets out of sync, then $\rho_{i+1}$ cannot be reconstructed and the server is not able to receive newly transmitted bits. In order to avoid getting out of sync, the token 140 should not use this method of transmission very often and r should be small.

Once the server 125 goes out of sync, then a reset functionality should be supplied, e.g., based on the combined counter idea, as discussed above in conjunction with FIG. 7. For example, define a first counter of $\rho_{i+1,0} = h(\rho_{i,0})$ together with a transmission channel, as follows $$\rho_{i,j+1} = \text{XOR}_{b=1}^{r} x_{i,j,b} h(\rho_{i,j} \| b)$$

where $x_{i,j,b}$ is the b-th bit in the bit string $x_{i,j}$. The first counter can be used to reset the transmission channel (and to synchronize the token 140 and server 125 as a consequence).

It may be desirable to reset the transmission channel at regular time intervals if the server 125 is not able to communicate to the token 140. A different method is to compute as a function of $\rho_{i,j+1}$ whether to forward the counter, reset the transmission channel and transmit $x_{i,j}$ over the new channel instead. This makes resetting the channel an event-based approach.

Figure 8:
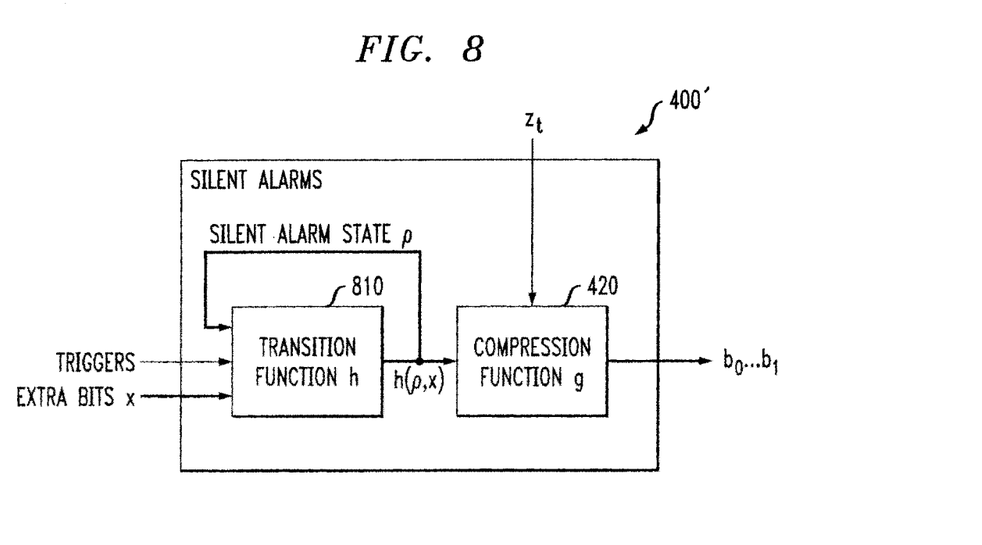
FIG. 8 is a block diagram of an exemplary alternate implementation of the silent alarm module of FIG. 4.

FIG. 8 is a block diagram of an exemplary alternate implementation 400' of the silent alarm module 400 of FIG. 4. As shown in FIG. 8, the exemplary alternate silent alarm module 400' comprises a transition function h 810 and the compression function 420. As shown in FIG. 8, the transition function h 810 applies a one-way hash function h on the current ρ value and annotation bits x to generate h(ρ,x). The output of the transition function h 810 is applied to the compression function 420, which operates as discussed above in conjunction with FIG. 4.

CONCLUSION

As previously indicated, the above-described embodiments of the invention are presented by way of illustrative example only. Numerous variations and other alternative embodiments may be used, as noted above. For example, FIGS. 6-8 provide a number of extensions of the embodiment described above in conjunction with FIGS. 3-5.

The present invention provides methods and apparatus for implementing silent alarm channels using one-time passcode authentication tokens. The disclosed silent alarm channels, for example, can signal an intrusion after an attacker has compromised a device. A silent alarm channel (SAC) is implemented over a one-time passcode authentication token. An efficient silent alarm channel is provided over an underlying low-bandwidth elementary channel imposed by the one-time passcodes that are generated by a possibly resource-constrained token and sent by the token to a receiving authentication server.

Additional details regarding certain conventional cryptographic techniques referred to herein may be found in, e.g., A. J. Menezes et al., Handbook of Applied Cryptography, CRC Press, 1997, which is incorporated by reference herein.

The illustrative embodiments of the invention as described herein provide secure transmission of messages over a silent alarm channel using a one-time passcode authentication token. Advantageously, the illustrative embodiments do not require changes to existing communication protocols. It is therefore transparent to both existing applications and communication protocols.

It should again be emphasized that the particular authentication and communication techniques described above are provided by way of illustration, and should not be construed as limiting the present invention to any specific embodiment or group of embodiments. For example, as previously noted, the described embodiments may be adapted in a straightforward manner to operate with other types of credentials or authentication information. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for transmitting a message from a sender to a receiver indicating a potential attack on a protected resource, comprising:
   obtaining said message, wherein a content of said message is not previously known to said receiver;
   encrypting, using at least one hardware device, said message using an authenticated encryption scheme, wherein said authenticated encryption scheme employs a secret key shared by said sender and said receiver, wherein said authenticated encryption scheme comprises an integrity check of said message;
   combining, using at least one hardware device, said message encrypted using said authenticated encryption scheme with a tokencode generated by a security token to generate a one-time passcode, wherein said one-time passcode is based on a forward secure pseudo random number derived from said secret key such that said secret key remains secure in a forward time direction; and
   transmitting said one-time passcode to a receiver.

2. The method of claim 1, wherein said tokencode is based on a secret shared between said security token and an authentication authority.

3. The method of claim 1, further comprising the step of encoding said encrypted message into a codeword c using a codebook C.

4. The method of claim 3, further comprising combining said codeword c and said tokencode to generate said one-time passcode.

5. The method of claim 3, wherein said combining step comprises a digitwise addition modulo 10 of said codeword c and said tokencode to generate said one-time passcode.

6. The method of claim 1, wherein said encrypted message comprises a one-bit message indicating whether said protected resource has been attacked.

7. The method of claim 6, further comprising the step of encoding said one-bit message as n-bits.

8. The method of claim 7, further comprising the step of compressing said n-bits to l bits.

9. The method of claim 8, wherein said compressing step comprises applying a hash function to said n-bits.

10. The method of claim 9, wherein said hash function is based on a key generated by a forward secure pseudo random number generator.

11. The method of claim 8, wherein said compressing step comprises applying a dot product function to said n-bits with a random bit vector of size n, wherein said dot product function is defined over binary strings of size n.

12. The method of claim 8, further comprising the step of encoding said l bits to a codeword c using a codebook C.

13. The method of claim 1, wherein said step of obtaining said message further comprises obtaining a plurality of said messages in parallel, and wherein said plurality of parallel messages are encrypted using said authenticated encryption scheme and combined with said tokencode to generate said one-time passcode.

14. The method of claim 7, wherein a subsequent encrypted message is generated by applying a hash function to a prior n-bit value to provide a counter identifying each encrypted message.

15. The method of claim 1, wherein said encrypted message further comprises one or more additional bits to provide an annotation of said encrypted message.

16. An apparatus for transmitting a message from a sender to a receiver indicating a potential attack on a protected resource, the apparatus comprising:
   a memory; and
   at least one hardware device, coupled to the memory, operative to implement the following steps:
      obtaining said message, wherein a content of said message is not previously known to said receiver;
      encrypting, using said at least one hardware device, said message using an authenticated encryption scheme, wherein said authenticated encryption scheme employs a secret key shared by said sender and said receiver, wherein said authenticated encryption scheme comprises an integrity check of said message;
      combining, using said at least one hardware device, said message encrypted using said authenticated encryption scheme with a tokencode generated by a security token to generate a one-time passcode, wherein said one-time passcode is based on a forward secure pseudo random number derived from said secret key such that said secret key remains secure in a forward time direction; and
      transmitting said one-time passcode to a receiver.

17. The apparatus of claim 16, wherein said tokencode is based on a secret shared between said security token and an authentication authority.

18. The apparatus of claim 16, further comprising the step of encoding said encrypted message into a codeword c using a codebook C.

19. The apparatus of claim 18, further comprising combining said codeword c and said tokencode to generate said one-time passcode.

20. The apparatus of claim 18, wherein said combining step comprises a digitwise addition modulo 10 of said codeword c and said tokencode to generate said one-time passcode.

21. The apparatus of claim 16, wherein said encrypted message comprises a one-bit message indicating whether said protected resource has been attacked.

22. The apparatus of claim 21, further comprising the step of encoding said one-bit message as n-bits.

23. The apparatus of claim 22, further comprising the step of compressing said n-bits to l bits.

24. The apparatus of claim 23, wherein said compressing step comprises applying a hash function to said n-bits.

25. The apparatus of claim 24, wherein said hash function is based on a key generated by a forward secure pseudo random number generator.

26. The apparatus of claim 23, wherein said compressing step comprises applying a dot product function to said n-bits with a random bit vector of size n, wherein said dot product function is defined over binary strings of size n.

27. The apparatus of claim 23, further comprising the step of encoding said l bits to a codeword c using a codebook C.

28. The apparatus of claim 16, wherein said step of obtaining said message further comprises obtaining a plurality of said messages in parallel, and wherein said plurality of parallel messages are encrypted using said authenticated encryption scheme and combined with said tokencode to generate said one-time passcode.

29. The apparatus of claim 22, wherein a subsequent encrypted message is generated by applying a hash function to a prior n-bit value to provide a counter identifying each encrypted message.

30. The apparatus of claim 16, wherein said encrypted message further comprises one or more additional bits to provide an annotation of said encrypted message.

31. An article of manufacture for transmitting a message from a sender to a receiver indicating a potential attack on a protected resource, comprising a non-transitory machine readable recordable medium containing one or more programs which when executed implement the steps of:

obtaining said message, wherein a content of said message is not previously known to said receiver;

encrypting, using at least one hardware device, said message using an authenticated encryption scheme, wherein said authenticated encryption scheme employs a secret key shared by said sender and said receiver, wherein said authenticated encryption scheme comprises an integrity check of said message;

combining, using at least one hardware device, said message encrypted using said authenticated encryption scheme with a tokencode generated by a security token to generate a one-time passcode, wherein said one-time passcode is based on a forward secure pseudo random number derived from said secret key such that said secret key remains secure in a forward time direction; and transmitting said one-time passcode to a receiver.

* * * * *

UNITED STATES PATENT AND TRADEMARK OFFICE
CERTIFICATE OF CORRECTION

PATENT NO. : 9,515,989 B1
APPLICATION NO. : 13/404788
DATED : December 6, 2016
INVENTOR(S) : Juels et al.

It is certified that error appears in the above-identified patent and that said Letters Patent is hereby corrected as shown below:

In the Specification

In Column 5, Line 46, replace "Pseudorandom Numbers;" and/or" with
--Pseudorandom Numbers," now U.S. Pat. No. 9,008,303; and/or--.

In Column 10, Line 52, replace "extract c and decode in." with --extract c and decode m.--.

In Column 13, Line 34, replace "pair $(\rho_{i+2,0}, \rho_{i+1,1})$ When the" with --pair $(\rho_{i+2,0}, \rho_{i+1,1})$. When the--.

In Column 13, Line 49, replace "$\rho_{i+1} = h(\rho_i, x_i)$ In other words" with --$\rho_{i+1} = h(\rho_i, x_i)$. In other words--.

Signed and Sealed this
Twenty-eighth Day of February, 2017

Michelle K. Lee
*Director of the United States Patent and Trademark Office*